United States Patent
Revel et al.

(10) Patent No.: US 12,214,687 B2
(45) Date of Patent: Feb. 4, 2025

(54) ELECTRICAL-ENERGY TRANSFER DEVICE COMPRISING A CENTERING SYSTEM

(71) Applicant: Airbus SAS, Blagnac (FR)

(72) Inventors: Ivan Revel, Blagnac (FR); Didier Chassaigne, Blagnac (FR); Frederic Forget, Blagnac (FR); Antoine Loehrmann, Blagnac (FR); Olivier Crepel, Blagnac (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 18/452,786

(22) Filed: Aug. 21, 2023

(65) Prior Publication Data
US 2024/0067020 A1  Feb. 29, 2024

(30) Foreign Application Priority Data
Aug. 23, 2022 (FR) ...................................... 2208460

(51) Int. Cl.
*B60L 53/38* (2019.01)
*B60L 53/12* (2019.01)
*B60L 53/302* (2019.01)

(52) U.S. Cl.
CPC .............. *B60L 53/38* (2019.02); *B60L 53/12* (2019.02); *B60L 53/302* (2019.02); *B60L 2200/10* (2013.01)

(58) Field of Classification Search
CPC ........ B60L 53/38; B60L 53/12; B60L 53/302; B60L 2200/10
USPC ....................................................... 307/104
See application file for complete search history.

(56) References Cited

U.S. PATENT DOCUMENTS

| | | | |
|---|---|---|---|
| 6,705,898 B2* | 3/2004 | Pechstein | H04B 5/22 439/950 |
| 8,971,072 B2* | 3/2015 | Calvin | H01F 5/04 363/64 |
| 2014/0235164 A1* | 8/2014 | Vaucher | H02J 50/80 307/104 |

(Continued)

FOREIGN PATENT DOCUMENTS

| JP | 2003209020 A | 7/2003 |
|---|---|---|
| JP | 5852873 B2 | 2/2016 |
| JP | 2019045163 A | 3/2019 |

OTHER PUBLICATIONS

French Search Report for corresponding French Patent Application No. 2208460 dated Feb. 24, 2023; priority document.

*Primary Examiner* — Alfonso Perez Borroto
(74) *Attorney, Agent, or Firm* — Greer, Burns & Crain, Ltd.

(57) ABSTRACT

An electrical-energy transfer device comprising first and second parts able to move one relative to the other between distanced and close-up states, the first part comprising a first housing configured to at least partially house the second part, comprising at least a first lateral surface on which at least a first electrical-energy transfer element is positioned, the second part having a second lateral surface for each first lateral surface of the housing, having an overall shape that complements the shape of the first housing and on which surface there is positioned at least one second electrical-energy transfer element, the first and second electrical-energy transfer elements performing a transfer of electrical energy between one another when the first and second parts are in the close-up state.

14 Claims, 5 Drawing Sheets

(56) References Cited

U.S. PATENT DOCUMENTS

2014/0252876 A1* 9/2014 Riezebos .............. H04B 5/263
307/104

* cited by examiner

ELECTRICAL-ENERGY TRANSFER DEVICE COMPRISING A CENTERING SYSTEM

CROSS-REFERENCES TO RELATED APPLICATIONS

This application claims the benefit of French Patent Application Number 2208460 filed on Aug. 23, 2022, the entire disclosure of which is incorporated herein by way of reference.

FIELD OF THE INVENTION

The present application relates to an electrical-energy transfer device comprising a centering system. This device is intended to equip a flying vehicle and a ground module.

BACKGROUND OF THE INVENTION

According to one embodiment visible in FIG. 1, a contactless electrical-energy transfer device comprises an electrical-energy emitting system 10 and an electrical-energy receiving system 12, the emitting and receiving systems being able to move one relative to the other and configured to allow a transfer of electrical energy by magnetic induction when they are in a close-up state close to one another.

The emitting system 10 comprises a first casing 14 which has a first face F14 oriented towards the receiving system 12. It also comprises, inside the first casing 14, at increasing distances away from the first face F14, at least a first coil 16 (also referred to as emitter coil) positioned in the first casing 14, a layer of ferromagnetic elements 18, for example made of ferrite, and a shielding plate 20.

The receiving system 12 comprises a second casing 22 which has a second face F22 oriented towards the emitting system 10. It also comprises, inside the second casing 22, at increasing distances away from the second face F22, at least one second coil 24, also referred to as receiving coil, positioned in the second casing 22, a layer of ferromagnetic elements 26 for example made of ferrite, and a shielding plate 28.

In one configuration, the first and second coils 16, 24 are each double-D shaped and the first and second casings 14, 22 are filled with a potting resin.

With this embodiment, the first and second coils 16, 24 are flat coils and have turns coiled concentrically about axes of coiling A16, A24, in first and second planes P1, P2.

For optimal transfer of electrical energy it is necessary for the axes of coiling A16, A24 of the emitting and receiving systems 10 and 12 to be aligned. In practice this alignment is relatively complex to achieve and to maintain.

The present invention seeks to overcome all or some of the disadvantages of the prior art.

SUMMARY OF THE INVENTION

To this end, the subject of the invention is an electrical-energy transfer device comprising a first part which comprises a first frontal face and at least one first electrical-energy transfer element, and a second part which comprises at least one second electrical-energy transfer element, the first and second parts being able to move one relative to the other in a direction of closing between a distanced state and a close-up state, the first and second electrical-energy transfer elements being configured to perform a transfer of electrical energy between one another in the close-up state.

According to the invention, the first part comprises a first housing opening onto the first frontal face of the first part and comprising at least a first lateral surface, said first housing being configured to at least partially house the second part, the second part having a second lateral surface for each first lateral surface of the housing of the first part, the second part having an overall shape that complements the shape of the first housing. In addition, each first electrical-energy transfer element is positioned at the first lateral surface and each second electrical-energy transfer element is positioned at the second lateral surface and approximately centered with respect to one of the first electrical-energy transfer elements when the first and second parts are in the close-up state.

According to the invention, the first part also comprises at least one layer of ferromagnetic elements surrounding the first lateral surface, each first electrical-energy transfer element being positioned between the layer of ferromagnetic elements and the first surface.

Thanks to the housing that centers the first and second electrical-energy transfer elements one relative to the other, the first and second parts, when in the close-up state, cannot fail to be positioned in such a way as to provide optimal transfer of electrical energy.

According to another feature, the layer of ferromagnetic elements has a substantially identical geometry to the first lateral surface give or take any scaling.

According to another feature, the electrical-energy transfer device comprises several first or second electrical-energy transfer elements offset from one another in the direction of closing.

According to another feature, each first lateral surface is a surface of revolution.

According to another feature, at least a first lateral surface has cross sections that decrease with increasing distance from the first frontal face.

According to another feature, the housing comprises two first lateral surfaces, these being a distal first lateral surface distanced from the first frontal face, having cross sections that decrease with increasing distance from the first front face and an open first lateral surface, adjacent to the first frontal face, positioned between the distal first lateral surface and the first frontal face and having constant cross sections.

According to another feature, the first part comprises at least one centering pin oriented parallel to the direction of closing. In addition, the second part comprises at least one second housing configured to house the at least one centering pin.

According to another feature, the first part comprises a ferromagnetic element positioned in the centering pin.

According to another feature, of the first and second parts at least one comprises a guide sensor to assist with the positioning of the first and second parts relative to one another in a centered manner.

According to another feature, the electrical-energy transfer device comprises at least one locking system configured to hold the first and second parts in the close-up state.

According to another feature, the locking system comprises a torus-shaped helical spring, a first peripheral groove positioned at the first lateral surface of the first part and configured to partially house the torus-shaped helical spring, at least in the close-up state, and a second peripheral groove positioned at the second lateral surface of the second part and configured to partially house the torus-shaped helical spring, at least in the close-up state, the first and second peripheral grooves being positioned facing one another when the first and second parts are in the close-up state.

According to another feature, each first electrical-energy transfer element is a first coil or a turn of a first coil. In addition, each second electrical-energy transfer element is a second coil or a turn of a second coil.

According to another feature, the first part comprises at least one cooling system configured to keep the layer of ferromagnetic elements at a temperature below a given threshold.

According to another feature, the cooling system comprises a cooling circuit which has a heat-transport fluid inlet, a heat-transport fluid outlet and a circuit portion connected between the heat-transport fluid inlet and outlet, said circuit portion being coiled at the first lateral surface between each first electrical-energy transfer element.

BRIEF DESCRIPTION OF THE DRAWINGS

Further features and advantages will become apparent from the following description of the invention, which description is given solely by way of example with reference to the attached drawings among which.

DETAILED DESCRIPTION OF THE PREFERRED EMBODIMENTS

Figure 1:
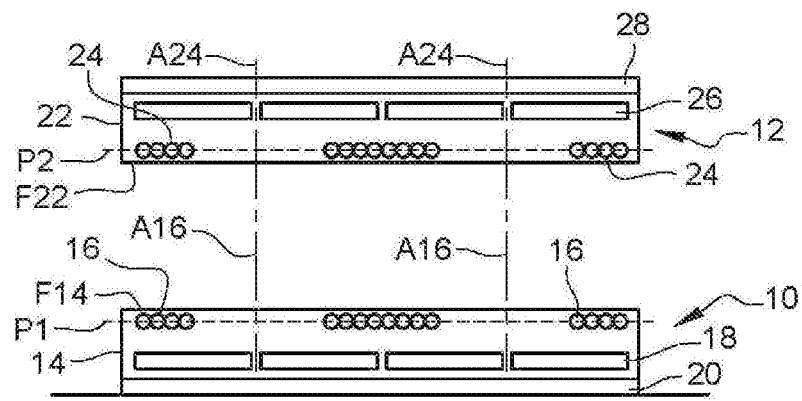
FIG. 1 is a schematic depiction of a contactless electrical-energy transfer device illustrating one embodiment of the prior art.
Figure 2:
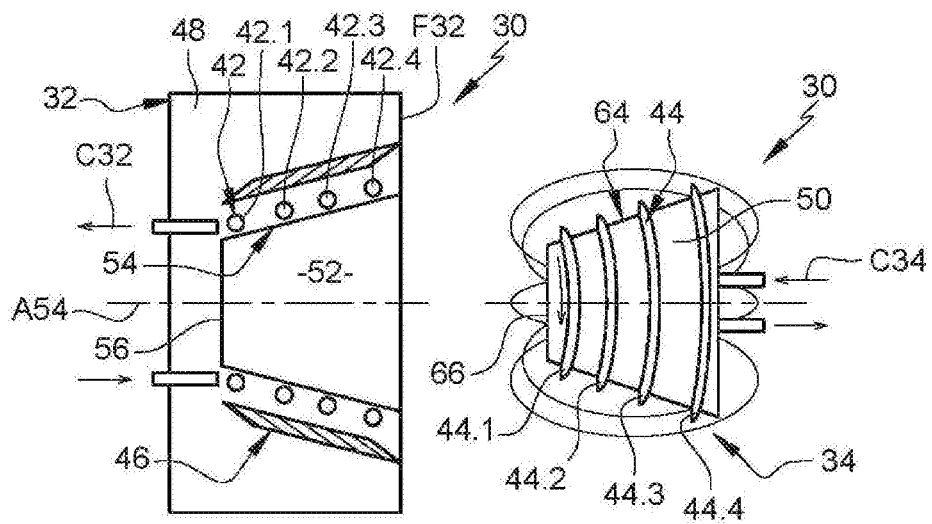
FIG. 2 is a schematic depiction of a contactless electrical-energy transfer device illustrating one embodiment of the invention in a distanced state.
Figure 3:
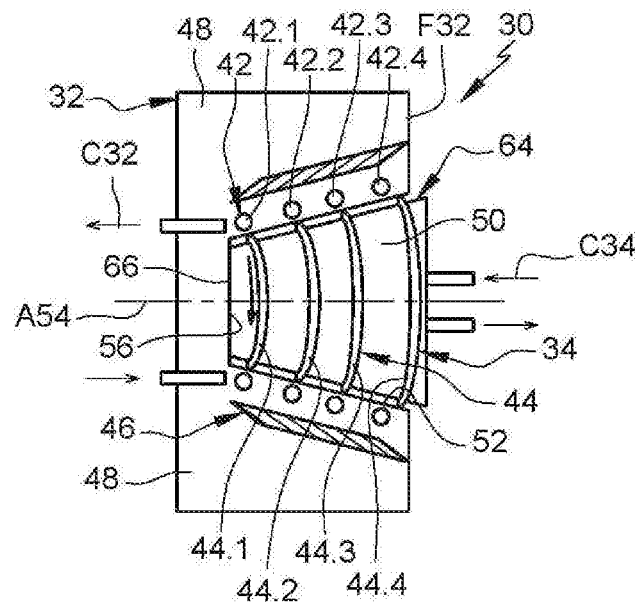
FIG. 3 is a schematic depiction of the contactless electrical-energy transfer device visible in FIG. 2, in a close-up state.

An electrical-energy transfer device 30 comprises a first part 32 and a second part 34, the first and second parts 32, 34 being able to move one relative to the other in a direction of closing between a distanced state visible in FIG. 2, and a close-up state, visible in FIG. 3, in which a transfer of electrical energy between the first and second parts 32, 34 is performed.

Figure 9:
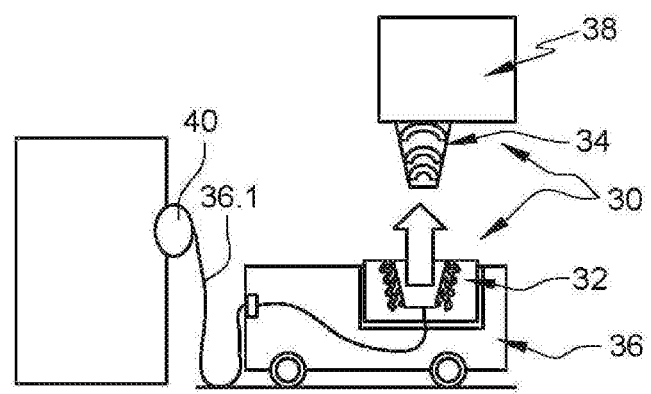
FIG. 9 is a schematic depiction of a flying vehicle and of a ground module which are equipped with an electrical-energy transfer device illustrating a first application of the invention, and, FIG. 10 is a schematic depiction of a flying vehicle and of a ground module which are equipped with an electrical-energy transfer device illustrating a second application of the invention.
Figure 10:
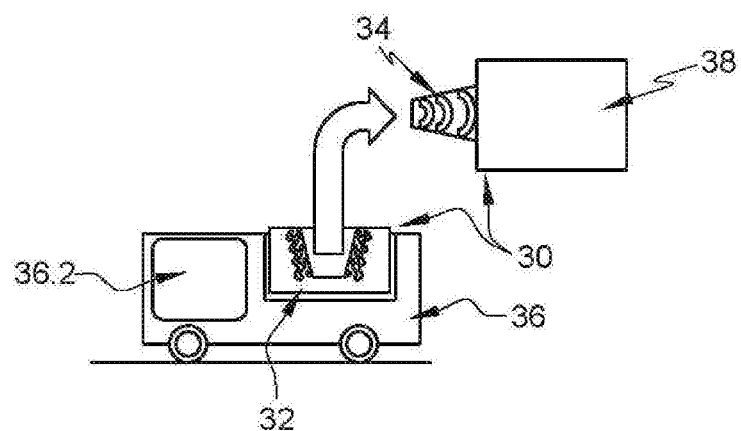

According to applications visible in FIGS. 9 and 10, the electrical-energy transfer device 30 is used to transfer electrical energy between a ground module 36 that incorporates the first part 32, and a flying vehicle 38 that incorporates the second part 34 and that may be an airplane, a flying vehicle of the eVTOL (electric vertical take-off and landing) type, a drone or any other flying vehicle.

The transfer of electrical energy can be used to recharge at least one electrical-energy storage system present in the flying vehicle 38 and/or to power at least one item of electrical equipment present in the flying vehicle 38.

According to one application, the ground module 36 is static. According to other applications visible in FIGS. 9 and 10, the ground module 36 is able to move and corresponds to a land vehicle. According to one configuration visible in FIG. 9, the ground module 36, which is mobile, is connected by an electrical cable 36.1 to an electrical power supply 40 in order to power the first part 32 of the electrical-energy transfer device 30. According to another configuration visible in FIG. 10, the ground module 36, which is mobile, comprises at least one rechargeable electrical-energy storage system 36.2 for powering the first part 32 of the electrical-energy transfer device 30.

Of course, the invention is not restricted to these applications.

Figure 4:
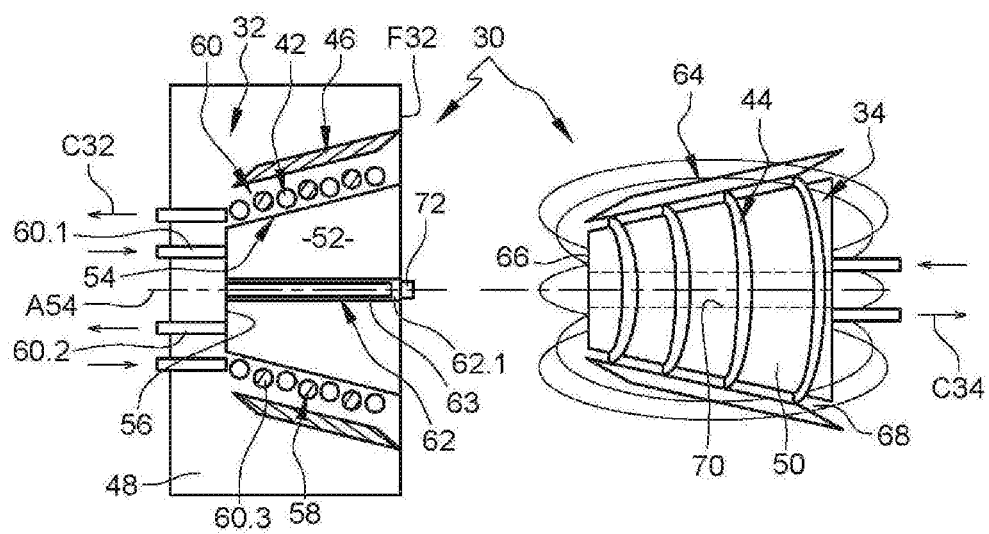
FIG. 4 is a schematic depiction of a contactless electrical-energy transfer device illustrating another embodiment of the invention.

In a first variant visible in FIGS. 2 to 4, the electrical-energy transfer device 30 comprises a contactless system for the transfer of electrical energy between a first electrical circuit C32 integral with the first part 32 and a second electrical circuit C34 integral with the second part 34.

According to one mode of operation, the first part 32 corresponds to an electrical-energy emitting system and the second part 34 corresponds to an electrical-energy receiving system.

The contactless energy transfer system comprises at least a first coil 42 integral with the first part 32 and connected to the first electrical circuit C32 and a second coil 44 integral with the second part 34 and connected to the second electrical circuit C34.

According to one embodiment, the first part 32 comprises, in addition to the first coil 42, a first frontal face F32 substantially perpendicular to the direction of closing, at least one layer of ferromagnetic elements 46, for example made of ferrite, and a first support 48 supporting the first coil 42 and the layer of ferromagnetic elements 46. In addition, the first part 32 may comprise at least one shielding plate.

The second part 34 comprises a second support 50 supporting the second coil 44. The second part 34 may comprise at least one layer of ferromagnetic elements, for example made of ferrite, and at least one shielding plate. The absence of a layer of ferromagnetic elements and of the shielding plate makes it possible to reduce the mass of the second part 34.

The first part 32 comprises a first housing 52 which opens onto the first frontal face F32 of the first part 32, comprising at least a first lateral surface 54 and configured to at least partially house the second part 34.

According to one embodiment, the first lateral surface 54 is a surface of revolution and has a first axis of revolution A54. As illustrated in FIGS. 2 to 4, the first lateral surface 54 is frustoconical. In other configurations, the first lateral surface 54 may be conical, cylindrical, or in the shape of a hemisphere.

According to another embodiment, the first lateral surface 54 has oblong cross sections and comprises two portions of surface of revolution, each having an axis of revolution and which are connected by planar surfaces.

In these embodiments, the first lateral surface 54 comprises at least one portion of surface of revolution having a first axis of revolution A54. Thus, the first lateral surface 54 or just a portion of the first lateral surface 54 is a surface of revolution and has a first axis of revolution A54.

Providing a first lateral surface 54 that is a surface of revolution allows the first and second parts 32, 34 to be positioned in the close-up state without any need for concern regarding the relative orientation of the first and second parts 32, 34 about the first axis of revolution A54.

The axis of revolution A54 is parallel to the direction of closing. A transverse plane is perpendicular to the first axis of revolution A54.

In one arrangement, this first axis of revolution A54 is perpendicular to the first frontal face F32 of the first part 32.

Depending on the geometry of the first lateral surface 54, the first housing 52 may comprise an end wall 56 that is substantially perpendicular to the axis of revolution A54.

In one configuration, the first housing 52 or the first lateral surface 54 has cross sections (in planes perpendicular to the first axis of revolution A54) which decrease with increasing distance away from the first frontal face F32. This configuration makes it possible to achieve self-centering as the second part 34 is being inserted into the first housing 52 of the first part 32.

In one configuration, the housing 52 comprises two first lateral surfaces 54, these being a distal first lateral surface distanced from the first frontal face F32, having cross sections that decrease with increasing distance from the first frontal face F32, and an open first lateral surface, adjacent to the first frontal face F32, positioned between the distal first lateral surface and the first frontal face F32 and having constant cross sections. In one configuration, the first part 32 comprises a single first coil 42 which has several turns 42.1 to 42.4 coiled at the first lateral surface 54 and offset from one another in the direction of closing. In one arrangement, the coils 42.1 to 42.4 are evenly distributed in the direction of closing.

In another configuration, the first part 32 comprises several first coils 42 coiled at the first lateral surface 54, and offset from one another in the direction of closing. In one arrangement, the first coils 42 are uniformly distributed in the direction of closing. According to one embodiment, the first support 48 is a block of material, for example made of resin, that has a first surface corresponding to the first frontal face F32 and a hollow corresponding to the first housing 52.

In a first arrangement, the turns of the first coil 42 or the first coils 42 are completely embedded in the block of material of the first support 48 and are offset towards the inside of the first support 48 relative to the first lateral surface 54 while being spaced a small distance from said first lateral surface 54. In a second arrangement, the turns of the first coil 42 or the first coils 42 are partially embedded in the block of material of the first support 48 and positioned astride the first lateral surface 54. In a third arrangement, the turns of the first coil 42 or the first coils 42 are not embedded in the block of material of the first support 48 and are offset towards the outside of the first support 48 relative to the first lateral surface 54, being spaced a small distance away from said first lateral surface 54.

Whatever the arrangement, the turns of the first coil 42 or the first coils 42 are held immobile relative to the first part 32 by any suitable retaining system.

When the first part 32 comprises a layer of ferromagnetic elements 46, this layer has a substantially identical geometry to the first lateral surface 54, give or take any scaling. In one configuration, each turn of the first coil 42 or each first coil 42 is positioned inside the layer of ferromagnetic elements 46, between the axis of revolution A54 and the layer of ferromagnetic elements 46. The layer of ferromagnetic elements 46 of the first part 32 surrounds the first lateral surface 54. Each turn of the first coil 42 or each first coil 42 is positioned between the layer of ferromagnetic elements 46 and the first lateral surface 54.

According to one embodiment illustrated in FIG. 4, the first part 32 comprises at least one cooling system 58 configured to keep the layer of ferromagnetic elements 46 at a temperature below a given threshold. This cooling system 58 comprises a cooling circuit 60 which has a heat-transport fluid inlet 60.1, a heat-transport fluid outlet 60.2 and a circuit portion 60.3 coiled at the first lateral surface 54 between the turns of the first coil 42 or the first coils 42, and embedded in the block of material of the first support 48.

According to an embodiment visible in FIG. 4, the first part 32 comprises at least one centering pin 62, oriented parallel to the direction of closing and which has a first end connected to the first part 32 and a free second end 62.1. In one configuration, the centering pin 62 is cylindrical and its free end 62.1 is positioned approximately in the same plane as the first frontal face F32 of the first part 32. In one arrangement, the cylindrical centering pin 62 has an axis coincident with the first axis of revolution A54.

In one configuration, at least one ferromagnetic element 63 is positioned in the centering pin 62.

The second part 34 has at least one second lateral surface 64 substantially identical, give or take any scaling, to the first surface 54 of the first housing 52 of the first part 32. The second lateral surface 64 has at least one second axis of revolution A64 and one second lateral surface 64 for each first lateral surface 54 of the housing 52 of the first part 32, each second lateral surface 64 being substantially identical, give or take any scaling, to the corresponding first lateral surface 54. The second part 34 has an overall shape that complements the shape of the first housing 52.

In the close-up state, when the second part 34 is at least partially positioned in the first housing 52 of the first part 32, the first and second lateral surfaces 54, 64 are positioned facing one another spaced apart by a small distance that is substantially identical on all of their surfaces.

When the first housing 52 has an end wall 56, the second support 50 has a second frontal face 66 substantially perpendicular to the second axis of revolution A64. In the close-up state, the second frontal face 66 of the second support 50 is in contact with or spaced only slightly away from the end wall 56 of the first housing 52 of the first part 32.

In one configuration, the second part 34 comprises a single second coil 44 which has several turns 44.1 to 44.4 coiled at the second lateral surface 64 and offset from one another in the direction of closing. In one arrangement, the turns 44.1 to 44.4 are evenly distributed in the direction of closing.

In another configuration, the second part 34 comprises several second coils 44 coiled at the second lateral surface 64 and offset from one another in the direction of closing. In one arrangement, the second coils 44 are evenly distributed in the direction of closing.

According to one embodiment, the second support 50 is a block of material, for example made of resin, that has a first surface corresponding to the second frontal face 66 and a lateral face corresponding to the second lateral surface 64.

In a first arrangement, the turns of the second coil 44 or the second coils 44 are completely embedded in the block of material of the second support 50 and offset towards the inside of the second support 50 with respect to the second lateral surface 64, being spaced a small distance away from said second lateral surface 64. In a second arrangement, the turns of the second coil 44 or the second coils 44 are partially embedded in the block of material of the second support 50 and positioned astride the second lateral surface 64. In a third arrangement, the turns of the second coil 44 or the second coils 44 are not embedded in the block of material of the second support 50 and are offset towards the outside of the second support 50 relative to the second lateral surface 64, being spaced only a small distance away from said second lateral surface 64.

In a fourth arrangement, the turns of the second coil 44 or the second coils 44 are positioned in a cavity 68 formed in the second support 50.

Whatever the arrangement, the turns of the second coil 44 or the second coils 44 are kept immobile with respect to the first part 34 by any suitable retaining system.

When the first part 32 comprises at least one centering pin 62, the second part 34 comprises a second housing 70 for each centering pin 62, and configured to house this pin as a close fit. This second housing 70 comprises a cylindrical lateral wall of a diameter substantially equal to that of the centering pin 62. In one arrangement, the second housing 70 has an axis coincident with the second axis of revolution A64.

According to an embodiment visible in FIG. 4, of the first and second parts 32, 34 at least one comprises a guide sensor 72 to assist with the positioning of the first and second parts 32, 34 one relative to the other in a centered manner. By way of example, the guide sensor 72 is a positioning sensor. In one arrangement, the guide sensor 72 is positioned at the free second end 62.1 of the centering pin 62 of the first part 32.

In operation, when the first and second parts 32, 34 are in the close-up state as illustrated in FIG. 3, the second part 34 is at least partially housed in the first housing 52 of the first part 32 and the first and second coils 42, 44 are positioned facing one another, the second coils 44 being positioned inside the first coils 44 in a centered manner.

Providing a housing 52 with cross sections that decrease away from the first frontal face F32 of the first part 32 makes it possible to achieve self-centering as the second part 34 is being introduced into the housing 52.

According to another variant visible in FIGS. 5 to 8, the electrical-energy transfer device 30 comprises at least one with-contact electrical-energy transfer system configured to perform a transfer of electrical energy between a first electrical circuit C32 integral with the first part 32 and a second electrical circuit C34 integral with the second part 34.

Like with the first variant, the first part 32 comprises a first frontal face S32 and a first housing 52, opening onto the first frontal face F32 and comprising at least one first lateral surface 54 configured to at least partially accept the second part 34.

The first lateral surface 54 comprises at least one portion of surface of revolution having a first axis of revolution A54. Thus, the first lateral surface 54 or just a portion of the first lateral surface 54 is a surface of revolution and has a first axis of revolution A54.

In one arrangement, this first axis of revolution A54 is perpendicular to the first frontal face F32 of the first part 32.

Depending on the geometry of the first lateral surface 54, the first housing 52 may comprise an end wall 56 substantially perpendicular to the axis of revolution A54.

In one configuration, the first housing 52 or the first lateral surface 54 has cross sections (in planes perpendicular to the first axis of revolution A54) that decrease with increasing distance away from the first frontal face F32. This configuration makes it possible to achieve self-centering as the second part 34 is being inserted into the first housing 52 of the first part 32.

Figure 5:
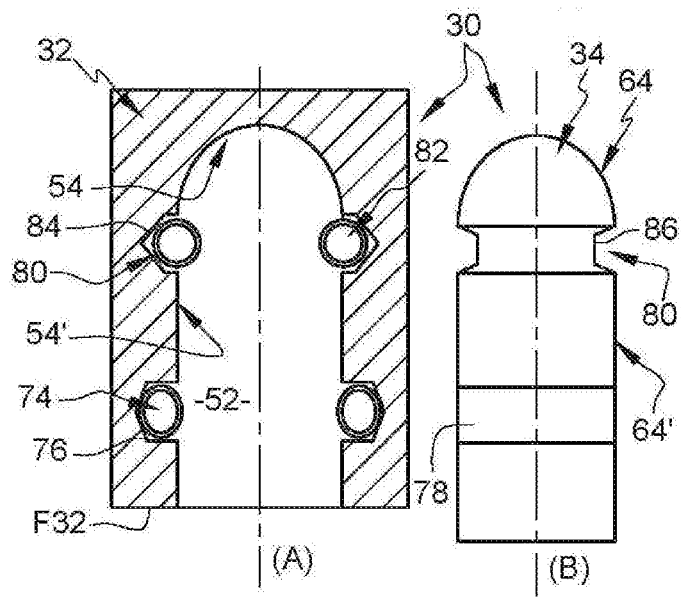
FIG. 5 is a schematic depiction of a with-contact electrical-energy transfer device illustrating one embodiment of the invention in a distanced state.
Figure 6:
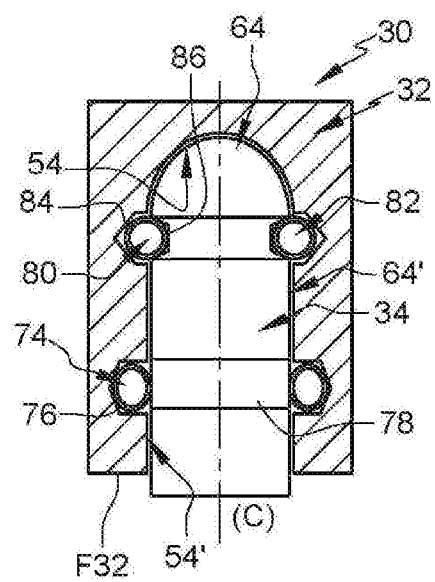
FIG. 6 is a schematic depiction of the with-contact electrical-energy transfer device visible in FIG. 5, in a close-up state.
Figure 7:
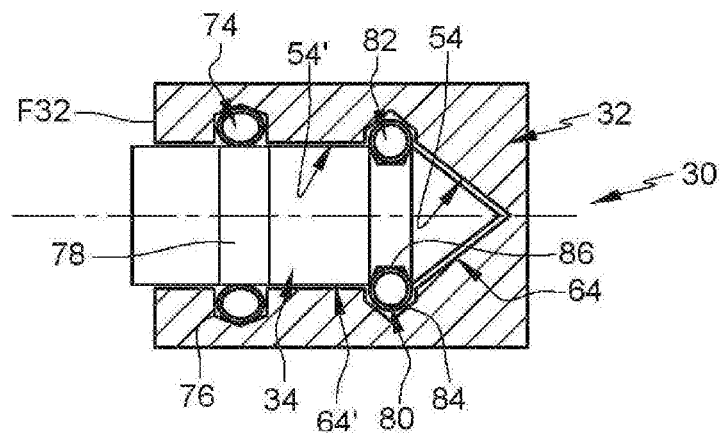
FIG. 7 is a schematic depiction of a with-contact electrical-energy transfer device illustrating another embodiment of the invention in a close-up state.

According to embodiments visible in FIGS. 5 to 7, the housing 52 comprises two first lateral surfaces 54, 54', a distal first lateral surface 54, distanced from the first frontal face F32, having cross sections that decrease with increasing distance away from the first frontal face F32, and an open first lateral surface 54', adjacent to the first frontal face F32, positioned between the distal first lateral surface 54 and the first frontal face F32 and having constant cross sections.

According to a first embodiment visible in FIGS. 5 and 6, the distal first lateral surface 54 is hemispherical and the open first lateral surface 54' is cylindrical.

According to a second embodiment visible in FIG. 7, the distal first lateral surface 54 is conical and the open first lateral surface 54' is cylindrical.

Figure 8:
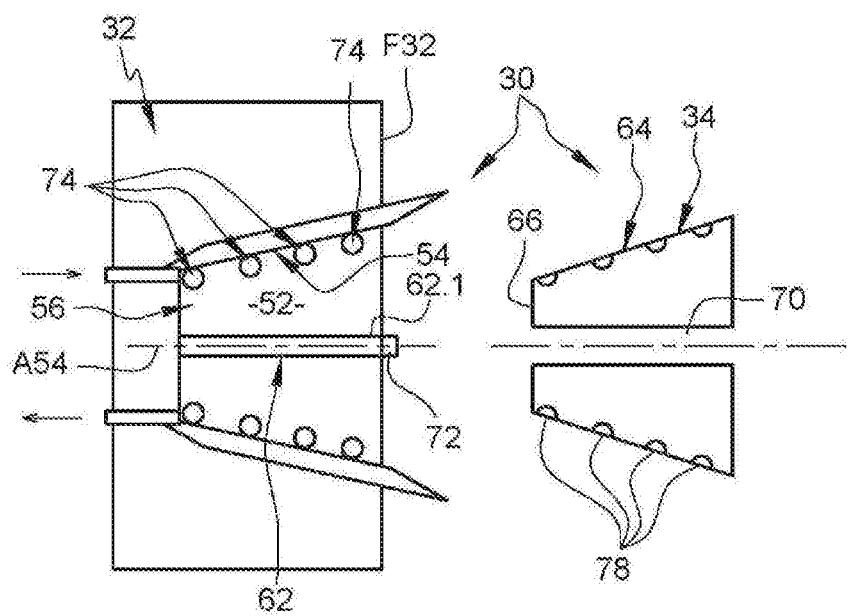
FIG. 8 is a schematic depiction of a with-contact electrical-energy transfer device illustrating another embodiment of the invention, in a distanced state.

According to another embodiment visible in FIG. 8, the housing 52 comprises a single first lateral surface 54, which is for example frustoconical.

The second part 34 has at least one second lateral surface 64 substantially identical, give or take any scaling, to the first lateral surface 54 of the first housing 52 of the first part 32. The second lateral surface 64 has at least one second axis of revolution A64 and has a second lateral surface 64 for each first lateral surface 54 of the housing 52 of the first part 32, each second lateral surface 64 being substantially identical, give or take any scaling, to the corresponding first lateral surface 54.

In the close-up state, when the second part 34 is at least partially positioned in the first housing 52 of the first part 32, the first and second lateral surfaces 54, 64 are positioned facing one another, spaced apart by a small distance that is substantially identical on all of their surfaces.

The with-contact electrical-energy transfer system comprises at least one torus-shaped helical spring 74 connected to the first or second electrical circuit C32, C34 and which, when the first and second parts 32, 34 are in the close-up state as illustrated in FIG. 6, is interposed between the first and second lateral surfaces 54, 64 of the first and second parts 32, 34 and ensures electrical continuity between the first and second electrical circuits C32, C34 of the first and second parts 32, 34.

According to one embodiment, of the first and second parts 32, 34 at least one comprises a peripheral groove 76, positioned at a first or second lateral surface 54, 64, and configured to partially house the torus-shaped helical spring 74 so that the latter projects from the first or second lateral surface 54, 64. According to the example illustrated in FIGS. 5 and 6, the peripheral groove 76 is provided on the first part 32.

The with-contact electrical-energy transfer system comprises a contact terminal 78 connected to a first or second electrical circuit C32, C34 different from the one to which the torus-shaped helical spring 74 is connected. This spring and the contact terminal 78 are arranged in such a way that the torus-shaped helical spring 74 is in contact with the contact terminal 78 when the first and second parts 32, 34 are in the close-up state.

According to one embodiment, the contact terminal 78 is a ring that extends over the entire circumference of the first or second lateral surface 54, 64.

In one arrangement, the first part 32 comprises the peripheral groove 76 and the torus-shaped helical spring 74 is connected to the first electrical circuit C32 of the first part 32. To complement this, the contact terminal 78 is integral with the second part 34 and connected to the second electrical circuit C34 of the second part 34. In another arrangement, the second part 34 comprises the peripheral groove 76 and the torus-shaped helical spring 74 is connected to the second electrical circuit C34 of the second part 34. To complement this, the contact terminal 78 is integral with the first part 32 and connected to the first electrical circuit C32 of the first part 32.

Of course, the invention is not restricted to this embodiment for keeping the torus-shaped helical spring 74 immobile in relation to the first or second part 32, 34 to which it is connected. Thus, the peripheral groove 76 may be replaced by any suitable retention system.

As illustrated in FIG. 8, the electrical-energy transfer device 30 comprises several with-contact electrical-energy transfer systems each comprising a torus-shaped helical spring 74, the various torus-shaped helical springs 74 being offset from one another in the direction of closing.

With this second variant, the first part 32 may comprise a centering pin 62 and the second part 34 may comprise a second housing 70, as in the first variant.

According to an embodiment visible in FIGS. 5 to 7, the electrical-energy transfer device 30 comprises at least one locking system 80 configured to hold the first and second parts in the close-up state. This embodiment may be applied indifferently to the first and second variants.

The locking system 80 comprises a torus-shaped helical spring 82 which, when the first and second parts 32, 34 are in the close-up state as illustrated in FIG. 6, is interposed between the first and second lateral surfaces 54, 64 of the first and second parts 32, 34; a first peripheral groove 84, positioned at the first lateral surface 54 of the first part 32 and configured to partially house the torus-shaped helical spring 82, at least in the close-up state, so that this spring projects from the first lateral surface 54, and a second peripheral groove 86, positioned at the second lateral surface 64 of the second part 34 and configured to partially house the torus-shaped helical spring 82, at least in the close-up state, so that this spring projects relative to the second lateral surface 64. The first and second peripheral grooves 84, 86 are positioned facing one another when the first and second parts 32, 34 are in the close-up state. Thus, in the close-up state, the torus-shaped helical spring 82 is positioned in the first and second peripheral grooves 84, 86 spanning between them. In one configuration, in the distanced state, the torus-shaped helical spring 82 is held by the first part 32. It is configured to compress elastically to allow the second part 34 to be introduced into the housing 52 of the first part 32 and revert to an uncompressed state when the first and second peripheral grooves 84, 86 are positioned facing one another and the first and second parts 32, 34 are in the close-up state.

Whatever the variant, the energy transfer device comprises at least one first electrical-energy transfer element (either a turn of a first coil 42, or a first coil 42, or a torus-shaped helical spring 74 or a contact terminal 78) which is connected to the first electrical circuit C32 and positioned at the first lateral surface 54 of the first part 32, and at least one second electrical-energy transfer element (either a turn of a first coil 42, or a first coil 42, or a torus-shaped helical spring 74, or a contact terminal 78) which is connected to the second electrical circuit C34 and positioned at the second lateral surface 64 of the second part 34 and approximately centered relative to a first energy transfer element when the first and second parts 32, 34 are in the close-up state, the first and second electrical-energy transfer elements being configured to perform a transfer of electrical energy between one another in the close-up state.

Thus, by virtue of the housing 52 that allows the first and second electrical-energy transfer elements to be centered relative to one another, the first and second parts 32, 34, when in this close-up state, cannot fail to be positioned in such a way as to provide optimal transfer of electrical energy.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical-energy transfer device comprising:
   a first part which comprises a first frontal face and at least one first electrical-energy transfer element, and
   a second part which comprises at least one second electrical-energy transfer element,
   the first and second parts being configured to move one relative to the other in a direction of closing between a distanced state and a close-up state,
   the first and second electrical-energy transfer elements being configured to perform a transfer of electrical energy between one another in the close-up state,
   the first part further comprising a first housing opening onto the first frontal face of the first part and comprising at least a first lateral surface, said first housing being configured to at least partially house the second part,
   the second part further comprising a second lateral surface for each first lateral surface of the first housing of the first part, the second part having an overall shape that complements the shape of the first housing,
   each first electrical-energy transfer element being positioned at the first lateral surface and each second electrical-energy transfer element being positioned at the second lateral surface and approximately centered with respect to one of the first electrical-energy transfer elements when the first and second parts are in the close-up state,
   the first part further comprising at least one layer of ferromagnetic elements surrounding the first lateral surface,
   each first electrical-energy transfer element being positioned between the layer of ferromagnetic elements and the first lateral surface.

2. The electrical-energy transfer device according to claim 1, wherein the layer of ferromagnetic elements has a substantially identical geometry to the first lateral surface give or take any scaling.

3. The electrical-energy transfer device according to claim 1, comprising a plurality of first or second electrical-energy transfer elements offset from one another in the direction of closing.

4. The electrical-energy transfer device according to claim 1, wherein each first lateral surface is a surface of revolution.

5. The electrical-energy transfer device according to claim 1, wherein at least a first lateral surface has cross sections that decrease with increasing distance from the first frontal face.

6. The electrical-energy transfer device according to claim 5, wherein the first housing comprises two first lateral surfaces each being a distal first lateral surface distanced from the first frontal face, and having cross sections that decrease with increasing distance from the first frontal face and an open first lateral surface, adjacent to the first frontal face, positioned between the distal first lateral surface and the first frontal face and having constant cross sections.

7. The electrical-energy transfer device according to claim 1, wherein the first part comprises at least one centering pin oriented parallel to the direction of closing and wherein the second part comprises at least one second housing configured to house the at least one centering pin.

8. The electrical-energy transfer device according to claim 7, wherein the first part comprises a ferromagnetic element positioned in the centering pin.

9. The electrical-energy transfer device according to claim 1, wherein of the first and second parts at least one comprises a guide sensor configured to assist with the positioning of the first and second parts relative to one another in a centered manner.

10. The electrical-energy transfer device according to claim 1, wherein the electrical-energy transfer device comprises at least one locking system configured to hold the first and second parts in the close-up state.

11. The electrical-energy transfer device according to claim 10, wherein the locking system comprises a torus-shaped helical spring, a first peripheral groove positioned at the first lateral surface of the first part and configured to partially house the torus-shaped helical spring, at least in the close-up state, and a second peripheral groove positioned at the second lateral surface of the second part and configured to partially house the torus-shaped helical spring, at least in the close-up state, the first and second peripheral grooves being positioned facing one another when the first and second parts are in the close-up state.

12. The electrical-energy transfer device according to claim 1, wherein each first electrical-energy transfer element is a first coil or a turn of a first coil and wherein each second electrical-energy transfer element is a second coil or a turn of a second coil.

13. The electrical-energy transfer device according to claim 12, wherein the first part comprises at least one cooling system configured to keep the layer of ferromagnetic elements at a temperature below a given threshold.

14. The electrical-energy transfer device according to claim 13, wherein the cooling system comprises a cooling circuit which has a heat-transport fluid inlet, a heat-transport fluid outlet and a circuit portion connected between the heat-transport fluid inlet and outlet, said circuit portion being coiled at the first lateral surface between each first electrical-energy transfer element.

\* \* \* \* \*